UNITED STATES PATENT OFFICE.

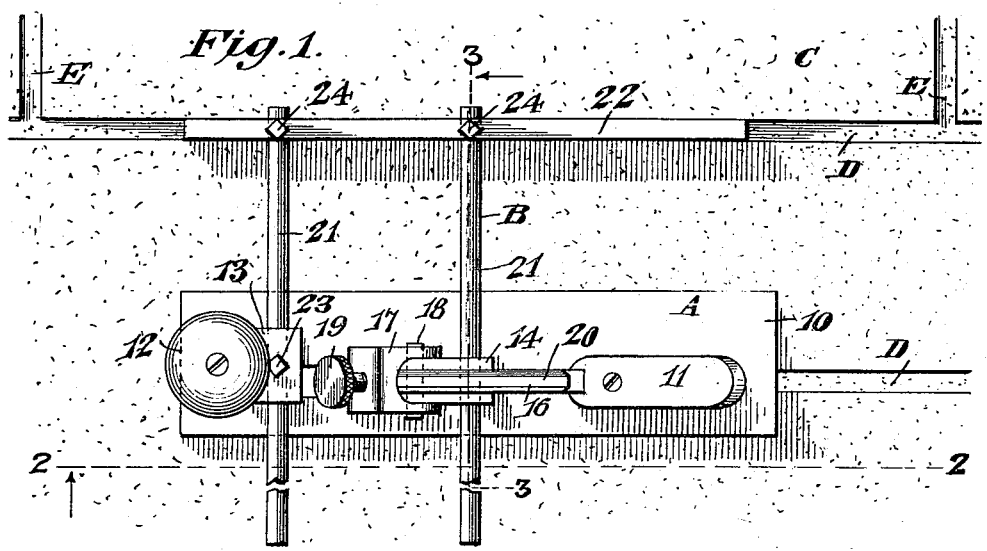
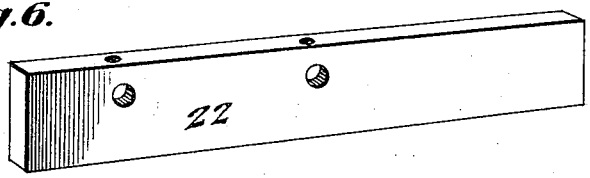
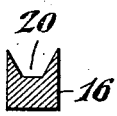
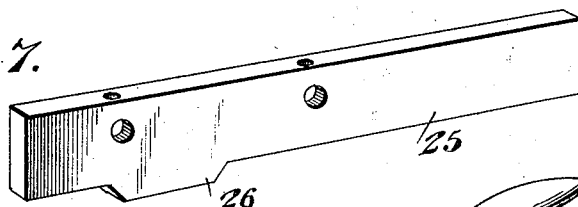
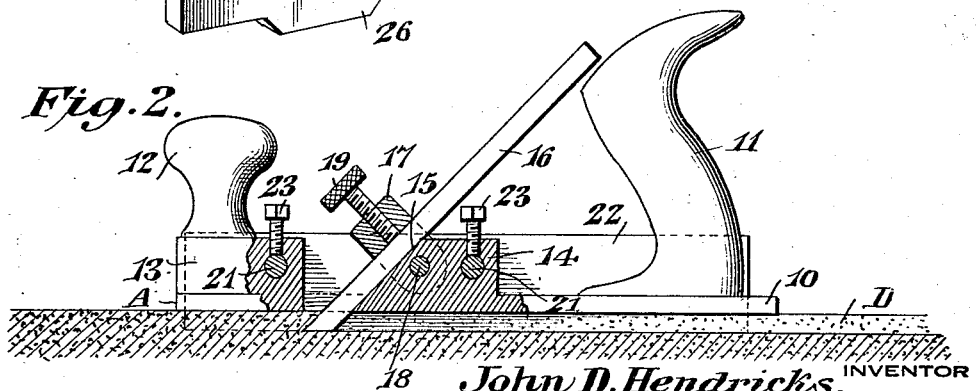

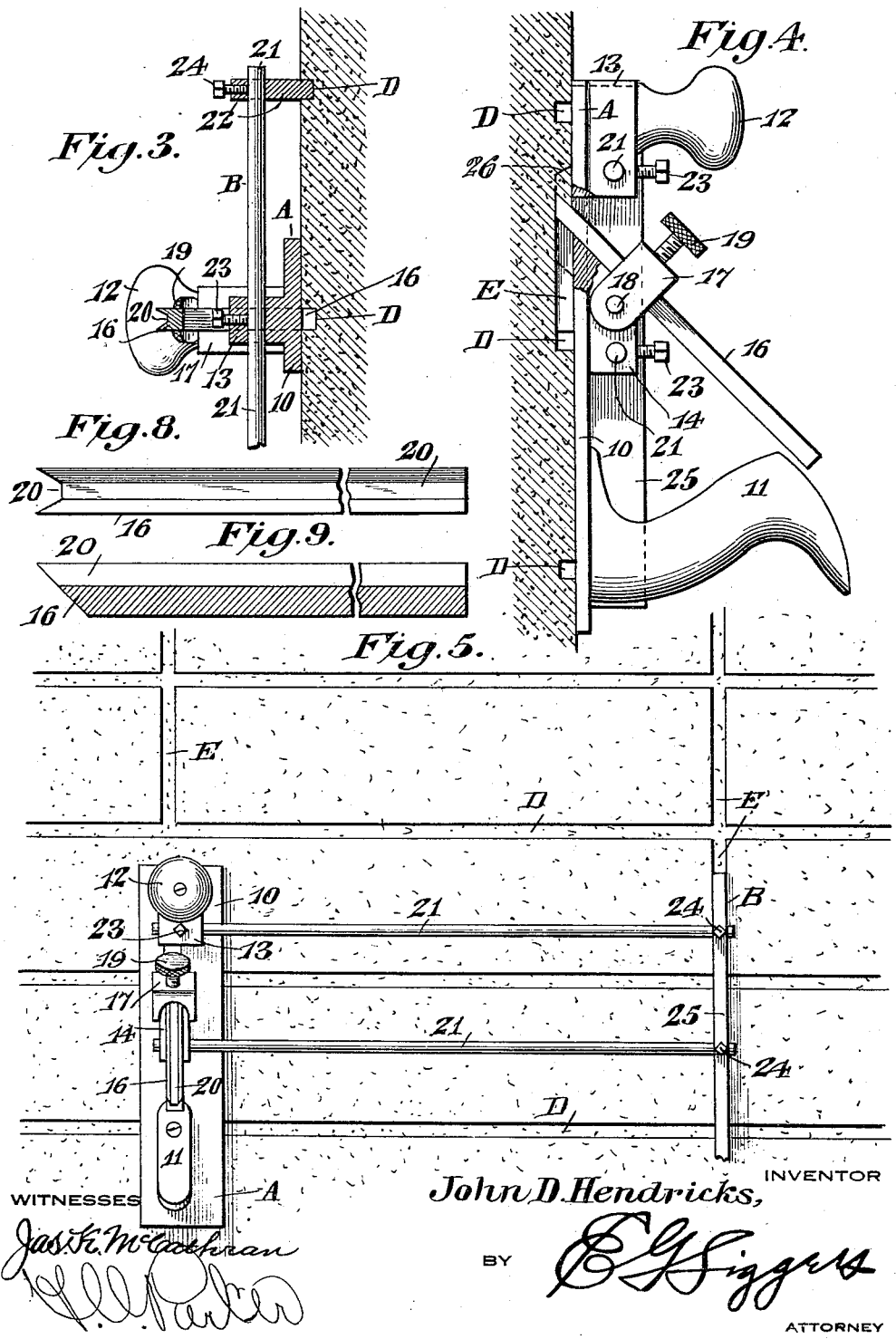

JOHN D. HENDRICKS, OF MIAMI, FLORIDA.

TOOL FOR FORMING GROOVES IN PLASTIC MASONRY.

1,283,761.  Specification of Letters Patent.  Patented Nov. 5, 1918.

Application filed June 15, 1917. Serial No. 174,926.

*To all whom it may concern:*

Be it known that I, JOHN D. HENDRICKS, a citizen of the United States, residing at Miami, in the county of Dade and State of Florida, have invented a new and useful Tool for Forming Grooves in Plastic Masonry, of which the following is a specification.

The invention relates to a marking device, and more particularly to the class of tools or implements for channeling or grooving artificial stone, cementitious or plastic surfaces.

The primary object of the invention is the provision of a tool or implement of this character, wherein brick joints can be imitated in a stucco or plastic wall or surface for imitating a brick edifice or structure.

Another object of the invention is the provision of a tool or implement of this character, wherein longitudinal and transverse grooves or channels can be formed with accuracy and despatch without mutilating or breaking the edges of the grooves or channels, when making the same, thus giving a neat and pleasing finish to the wall or surface imitative of brick jointed formation.

A further object of the invention is the provision of a tool or implement of this character, which is simple in construction, conveniently operated, readily and easily adjusted to vary the spacing of the grooves or channels, and also one which is inexpensive to manufacture.

With these and other objects in view, the invention consists in the features of construction, combination and arrangement of parts, as will be hereinafter fully described, illustrated in the accompanying drawings, and pointed out in the claims hereunto appended.

In the accompanying drawings:

Figure 1 is a plan view of a tool or implement constructed in accordance with the invention applied to a plastic surface for forming longitudinal grooves or channels therein.

Fig. 2 is a sectional view on the line 2—2 of Fig. 1, looking in the direction of the arrow with the tool or implement partly broken away.

Fig. 3 is a sectional view on the line 3—3 of Fig. 1, looking in the direction of the arrow.

Fig. 4 is a view similar to Fig. 2, showing the tool or implement applied for forming the transverse grooves.

Fig. 5 is a plan view with the tool or implement in the position in Fig. 4.

Fig. 6 is a perspective view of the gage runner for the longitudinal grooves.

Fig. 7 is a perspective view of the gage runner for the transverse grooves.

Fig. 8 is a plan view of the cutting bit.

Fig. 9 is a longitudinal sectional view thereof.

Fig. 10 is a transverse sectional view of the same.

Similar reference characters indicate like parts throughout the several figures.

Referring to the drawings in detail A designates the groove forming tool in the shape of a hand plane, and B the adjustable gage, the details of which will be hereinafter fully described.

The grooving tool A comprises a flat rectangular-shaped plate-like body 10 forming a base, preferably made from metal, although it may be made from any other suitable material, and can be of any desirable shape supporting at its outer face near the heel end thereof a handle 11, and at its opposite forward end a knob 12. The knob is suitably fixed upon a block-like enlargement 13, centrally of said body 10, and forwardly of a tool prop or bearing 14, which is spaced from the enlargement and is formed with a forwardly inclined or beveled face 15, which merges into a suitable opening in the body 10, through which is passed the cutting bit 16 adapted to rest against the inclined or beveled face 15 of the prop or bearing 14 when mounted within the plane.

Straddling the prop or bearing 14 is a clamping yoke 17 for the bit 16, which is passed therethrough, the yoke being supported upon a pivot 18, which is passed transversely through the prop or bearing 14 for connecting said yoke thereto. Threaded in the yoke 17 is a set screw 19 which is worked against the bit 16 for firmly clamping it upon the inclined or beveled face 15 of the prop or bearing 14, when said bit 16 has been properly adjusted for the making of a groove. It is obvious that on the adjustment of the bit 16, the depth of the groove formed thereby can be varied.

The bit 16, which constitutes one of the features of this invention, is formed with an inwardly tapered groove or channel 20 longitudinally therein, centrally throughout its length to intersect the cutting and opposite ends thereof, and this channel is designed to receive the loose material cut by the bit in the formation of the groove for the cleaning of said groove simultaneously with the cutting thereof, the material being fed through the channel 20 in the bit and discharged therethrough. The bit is self-sharpening by reason of its peculiar shape, the side lips 20ª, which are tapered to a sharp edge, enabling a clean smooth cut to be made.

Formed transversely in the enlargement 13 and prop or bearing 14 are suitable holes for accommodating the gage rods 21, which are slidable through said holes and support the gage runner 22, which is also provided with suitable holes for receiving the rods 21. The gage runner is of even thickness throughout and its thickness should be slightly less than the grooves made by the bit, so that when traveling in the grooves, the runner will not mutilate the same. Tapped in the enlargement 13 and prop or bearing 14, through the top thereof, are set screws 23, which secure the rods 21 adjustably connected with the plane, while tapped in the upper edge of the gage runner 22 are set screws 24, which adjustably secure the runner upon the rods.

In Fig. 6 of the drawings, the runner 22 illustrated, is designed particularly for use in the making of longitudinal grooves for the spacing of the plane with accuracy for the formation of said longitudinal grooves, while in Fig. 7 of the drawings, there is illustrated a modified form of gage runner 25, which is provided at its lower edge with a tongue 26 of a comparatively short length for the use of this gage runner 25 in the formation of the transverse grooves.

In the use of the tool or implement for the formation of the longitudinal grooves, by reference to Fig. 1 of the drawings, it will be noted that the plane is placed upon the outer face of the stucco, cementitious, or plastic substance C, it being understood, of course, that the gage B has been properly adjusted to the predetermined spacing apart of the longitudinal grooves, and the runner 22 of said gage is placed within the previously finished groove D next to the groove to be formed in the operation of the plane, and, on the advancement of the plane, the groove or channel will be formed with accuracy, both in its relation to the other groove or grooves previously formed and the shape thereof without breaking or mutilating the edges of said groove, and in thus forming the longitudinal grooves the stucco or plastic surface will be marked to simulate brick jointed formation.

By reference to Fig. 3 of the drawing it will be noted that the lower edge of the runner operates in the same horizontal plane as the cutting edge of the bit, the runner operating on the bottom of the groove.

Now, upon completion of the longitudinal grooves in the outer surface of the stucco or plastic substance, the gage runner 22 is removed and in lieu thereof is substituted the gage runner 25, so that the tool or implement is ready for the formation of the transverse grooves E, in the surface C, and this is accomplished by engaging the tongue 26 on the runner 25 in the finished groove next to the transverse groove to be formed, as is clearly illustrated in Fig. 5 of the drawings. The bit 16 in the plane, when actuated, cuts both the longitudinal and transverse grooves on the changing of the tool or implement in a manner, as hereinbefore described, and when the longitudinal and transverse grooves have been formed, the surface C will simulate or be imitative of brick jointed formation, thereby giving a neat and attractive appearance to the surface. The tool working on the side of a wall will throw out all cuttings without danger of clogging, the material cut by the bit falling to the ground. It is, of course, understood that in the formation of the grooves, as hereinbefore stated, the stucco or plastic substance is moist or in plastic condition, so that the substance can be cut with the grooves without resistance on advancing the plane. The contacting face of the plane will avoid the breaking of the substance or in any manner disfiguring the same while the tool or implement is in operation.

From the foregoing, it is thought that the construction and manner of operation of the invention will be clearly understood, and, therefore, a more extended explanation has been omitted.

What is claimed is:—

1. The combination with a tool for forming grooves in plastic masonry having a cutter adjustably and detachably clamped thereon for forming the groove, a gage formed from a straight flat bar disposed on edge to provide a runner, supporting rods connected to said bar, and means for detachably securing said rods to said implement, the lower edge of the runner being in the same horizontal plane as the active end of the cutter, the runner operating on the bottom of a groove previously formed by the cutter.

2. The combination with a tool for forming grooves in plastic masonry having a bearing and enlargement spaced from each other, and a cutter adjustably and detachably clamped on the bearing for forming the groove, a gage formed from a straight flat bar disposed on edge to provide a runner, supporting rods passed transversely through the bar constituting the gage and engageable in the enlargement and bearing, means for detachably securing the rods to the bar, means mounted in the bearing and enlargement to engage the rods for adjustably connecting the same to the implement, and a tongue depending from the bottom edge of the bar at an intermediate point of its length.

3. The combination with a tool for forming grooves in plastic masonry having a cutter for forming the groove, of a gage runner consisting of a relatively long flat bar of even thickness to fit and travel throughout its length in a groove previously made by the cutter, the lower edge of the runner traveling in the bottom of the groove, and means for adjustably connecting the gage runner to the implement so as to maintain the gage runner at one side of the same in spaced relation thereto, with the lower edge of the runner extending below the horizontal plane of the bottom of the implement, and operating in the same horizontal plane as the active end of the cutter.

4. The combination with a tool for forming grooves in plastic masonry having a cutter for forming the groove, of a gage runner consisting of a relatively long flat bar of even thickness to fit and travel throughout its length in a groove previously made by the cutter, means for adjustably connecting the gage runner to the implement, so as to maintain the gage runner at one side of the same in spaced relation thereto, and a depending tongue on the gage runner of a length less than the length of the gage runner, said tongue being provided at an intermediate point of the length of said gage runner and extending below the horizontal plane of the bottom of the implement.

In testimony that I claim the foregoing as my own I have hereto affixed my signature in the presence of two witnesses.

JOHN D. HENDRICKS.

Witnesses:
I. E. Schelling,
L. E. Thigpin.

Copies of this patent may be obtained for five cents each, by addressing the "Commissioner of Patents, Washington, D. C."